(12) United States Patent
Lobo et al.

(10) Patent No.: US 7,068,710 B2
(45) Date of Patent: Jun. 27, 2006

(54) RECEIVER FOR A SPREAD SPECTRUM SYSTEM

(75) Inventors: Natividade Albert Lobo, Windsor (GB); Tai Dossaji, Hillingdon (GB)

(73) Assignee: Nokia Corporation, Espoo (FI)

( * ) Notice: Subject to any disclaimer, the term of this patent is extended or adjusted under 35 U.S.C. 154(b) by 809 days.

(21) Appl. No.: 10/149,243

(22) PCT Filed: Dec. 8, 2000

(86) PCT No.: PCT/GB00/04698

§ 371 (c)(1),
(2), (4) Date: Sep. 24, 2002

(87) PCT Pub. No.: WO01/43299

PCT Pub. Date: Jun. 14, 2001

(65) Prior Publication Data

US 2003/0091107 A1    May 15, 2003

(30) Foreign Application Priority Data

Dec. 10, 1999  (GB)  .............................. 9929328.4

(51) Int. Cl.
*H04B 1/69*  (2006.01)

(52) U.S. Cl. ...................................... 375/150; 375/147

(58) Field of Classification Search ................ 375/150, 375/343, 130, 147
See application file for complete search history.

(56) References Cited

U.S. PATENT DOCUMENTS

| 6,101,222 A | * | 8/2000 | Dorricott ..................... 375/240 |
| 6,151,363 A | * | 11/2000 | Burl et al. ............. 375/240.17 |
| 6,181,911 B1 | * | 1/2001 | Sih et al. .................... 455/12.1 |
| 6,483,885 B1 | * | 11/2002 | Bradley et al. ............. 375/366 |
| 6,947,474 B1 | * | 9/2005 | Kober et al. ................ 375/148 |

OTHER PUBLICATIONS

"Synchronizing a Digital GPS Receiver" Melecon '96 8th. Mediterranean Electrotechnical Conference vol. II pp. 1043-1046.

"Signal Synchronization for Direct-Sequence Code-Division Multiple Access Radio Modems" vol. 9. No. 1 Jan.-Feb. 1998.

"An Efficient Timing Synchronization Technique for FFT Based Multi-Carrier Direct Sequence Spread Spectrum Transceiver" by Hong et al. 1998 IEEE. pp. 713-717.

* cited by examiner

*Primary Examiner*—Khai Tran
(74) *Attorney, Agent, or Firm*—Alston & Bird LLP

(57) ABSTRACT

A method for operation of a receiver of a spread spectrum system. The method includes generating in the receiver an expected signal, the expected signal being a function of time and frequency correlating the received time and frequency of the received signal with time and frequency shifted parameters of the expected signal deriving a computational expression indicative of the value of the correlation at a point displaced in time by the time offset plus the time shift and displaced in frequency by the frequency offset plus the frequency shift, and comparing the correlation measure with the computational expression to determine the time offset and the frequency offset.

6 Claims, 3 Drawing Sheets

RECEIVER FOR A SPREAD SPECTRUM SYSTEM

BACKGROUND OF THE INVENTION

The present invention is applicable in spread spectrum telecommunication systems and more specifically relates to receivers for use in such systems.

In telecommunications, two common examples of spread spectrum systems are CDMA and WCDMA. Other examples include the Global Positioning System (GPS). Global positioning system (GPS) is one example of a space based satellite navigation system that has the ability to pinpoint any location on earth with a high degree of accuracy, providing information on position, velocity and time (PVT) of a receiver. Other examples of spaced based satellite navigation system are TIMATION, transit, and GLONASS.

GPS is typically divided into three segments:
a space segment which essentially comprises the satellites and the signals they emit,
a control segment which monitors and maintains the satellite constellation,
a user segment which comprises GPS receivers, equipment, data collection and data processing techniques.

The GPS constellation typically consists of 24 satellites orbiting the earth every 24 hours. A minimum of four GPS satellites must be in clear view of a GPS receiver in order for the receiver to determine accurately its location. In overview, each satellite broadcasts signals that the GPS receiver receives and decodes and from these calculates the time taken for the signals to reach the receiver, this is called the time in transit. The receiver then multiplies the time in transit by the speed of electromagnetic radiation to determine the range from the satellite to the receiver. From there, in order to work out the receiver's 3 dimensional distance, velocity and time, the receiver applies the triangulation calculation. Triangulation involves calculating the intersection of points between four reference points given by the satellites and the intersection fixes or locates the position in 3-dimensional space.

It should be noted, however, that range measurement inherently contain errors common to measurements created by the unsynchronised operation of the satellite and the user clocks. This is why GPS uses four satellites to effect ranging. The measurements from three GPS satellites allow the GPS receiver to calculate the three unknown parameters representing its three dimensional position, while the fourth GPS satellite allows the GPS receiver to calculate the user clock error and therefore determine a more precise time measurement.

The signals broadcast by a satellite comprise radio frequency (RF) ranging codes and navigation data messages which are transmitted using spread spectrum techniques. The ranging codes enable the GPS receiver to measure the transit times of the signals and thereby determine the range between the satellite and the receiver. The navigation data messages are based on predetermined information regarding the orbital path of the satellite and thus provide an indication of the position of the satellite at the time the signals were transmitted.

The encoded signal generated by a satellite is in the form of a pseudo random noise (PRN) code which represents a sequence of random binary chips, each satellite transmitting a unique PRN sequence that repeats itself at definite intervals. In GPS, there is Precision Code (P-Code) having a chipping rate 10.23 MHz and which is reserved for military use, and a Course Acquisition code (C/A Code) having a chipping rate 1.023 MHz and which is allocated for commercial and personal use. A chip is 1 or −1. The codes are transmitted on two L-band frequencies: Link 1 (L1) at 1575.42 MHz and Link 2 (L2) at 1227.6 MHz. The code allocations on L1 are Course Acquisition code (C/A Code) and Precision Code (P-Code), and on L2 is only P-Code.

The C/A Code consists of a 1023 bit pseudo random (PRN) code, and a different PRN code is assigned to each GPS satellite. In addition, a 50 Hz navigation data message is superimposed on the C/A Code, and contains the data noted above. Thus the receiver can utilise the signal from a satellite by the particular C/A Code being submitted, to make pseudo-range measurements.

Turning now to the receivers, there is a wide range of GPS receivers available today, and typically the internal architecture of a GPS receiver comprises a front end that initially processes the incoming satellite signals, followed by signal processing stages that apply the algorithms to determine the receivers location, speed and time.

The front end in basic terms is similar to that of a superheterodyne receiver. The signal is detected by a GPS antenna and fed to a low noise amplifier. Following amplification, the signal is down converted to a lower workable frequency. This is achieved by mixing or heterodyning the GPS signal with another constant frequency signal. This mixing signal is produced by a local oscillator. When two signals are mixed, the original, the sum of the two and the difference between the two frequencies is output. The filter in the following stages selects only the difference frequency and rejects the others. This difference frequency produced by the down conversion step is known as the intermediate frequency IF. The signal is next converted from analogue to digital in an AD converter. The output level of the AD converter is monitored by a voltage comparator to check levels exceeding or dropping below threshold levels, and an automatic gain control continually adjusts the gain of the IF amplifier to maintain a constant output level. The digital signal from the AD converter is used as an input to several stages of signal processing dealing with the ranging process.

As indicated earlier, the ranging process aims to calculate the distance from the satellite to the receiver using the incoming PRN codes to time how long it has taken the signals transmitted by the satellite to arrive at the receiver. To achieve this, each receiver has the capability to generate an exact pattern of the code that each satellite transmits using a PRN signal generator. The incoming signal received from a particular satellite is likely to be out of phase with the internal one since the time it takes to travel from the satellite to the receiver, measured in units of time periods to transmit a chip may not be always known. The internally generated expected PRN signal from a particular satellite needs to be suitably delayed or phase shifted so that it matches with the received signal when compared. The strength of match can be measured from correlation between the two signal fragments. It is usual to correlate a fragment of the received sequence with a corresponding fragment of the expected signal from the satellite. As the digitised expected signal is periodic, the internally generated sequence can be delayed by rotating the sequence. The amount of shifting or offset that was required to match the two signals provides the receiver with a measurement of the time lag between the signal leaving the satellite and arriving at the receiver. This measurement is then used to derive the range.

In principle, if the time it takes for the signal to travel from the satellite to the receiver via a particular path were known, then it would be possible to predict a signal proportional to the signal arriving at the receiver via that path and the output from the correlator would be a large quantity related to the energy in that path. However, this time interval is not known to begin with. It is usual to acquire the exact time of travel for each significant path by using some form of search algorithm. As the signal is cyclic (at least for 20 ms) by shifting the fragment of expected signal by m shift positions, a delay of m multiplied by the sampling period in microseconds can be simulated. Various delays are tried and the output of the correlator is monitored. The delay that is identified as being the one that is appropriate is the one that yields the highest correlation output. If sub chip sampling is employed, (say 4 samples per chip which is currently common) then a high value is obtained for about 4 of the m rotations. The rotation that yields the highest correlation from these four contiguous rotations is used to calculate the time the signal has taken to travel from the satellite to the observer. Once the time has been estimated, the changes in this time are monitored using various tracking algorithms.

Referring more generally to spread spectrum systems, all the information transmitted is not retrievable from a single received pulse. For example in WCDMA each data element is modulated using a code comprising a string of positive and negative bits specific to an individual system user to create a set of data pulses. The entire set is transmitted. This allows the value of the data element to be retrieved even if only a subset of the pulses transmitted is accurately received. The value of the bit is, however, calculated using all the received pulses both accurate and inaccurate rather than from an individual pulse as in analogue systems.

Accordingly, spread spectrum systems like WCDMA employ broadly analogous synchronisation techniques to those described above in relation to the GPS ranging process. For example, in a WCDMA receiver, user data is retrieved from a desired spread signal by a de-spreading code known to the receiver, provided there is accurate synchronisation between the spread user signal and the (de)spreading code.

SUMMARY OF THE INVENTION

The present invention in one aspect provides a method for operation of a receiver of a spread spectrum system in which a signal received at the receiver has a received time and frequency and is transmitted from a transmitter in accordance with a predetermined modulation scheme and having a transmitted time and frequency, there being a time offset and a frequency offset between the received signal and the transmitted signal, and in which the receiver includes a predefined correlation surface in accordance with the predetermined modulation scheme, the method comprising:
  generating in the receiver an expected signal, the expected signal being a function of time and frequency comprising a frequency parameter shifted from the transmitter frequency and a time parameter shifted from the transmitter time,
  correlating the received signal based on the transmitters time and frequency of the received signal with the expected signal based on the time and frequency shifted parameters of the expected signal to provide respective correlation measures therebetween,
  deriving, using said correlation surface, a computational expression indicative of the value of the correlation at a point displaced in time by the time offset plus the time shift and displaced in frequency by the frequency offset plus the frequency shift, and comparing the correlation measure with the computational expression to determine the time offset and the frequency offset.

In the present invention, there is provided a method and corresponding means that embodies an algorithm that is designed to compute the result of a process of correlating the received baseband signal with a non-ideal—that is, a locally reconstructed (i.e. in the receiver)—signal. In this context, non-ideal indicates that the frequency used does not coincide with actual frequency (i.e. transmitter frequency), and time used does not coincide with actual time (i.e. transmitter clock time). As a result of a given set of correlations offset in time and frequency, the algorithm can be utilised to identify in a single process: (a) what the actual offsets are, and (b) what the actual time is. In conventional CDMA and GPS systems bit Synchronisation, Automatic Frequency Control (AFC) and Symbol demodulation are separate processes. The present invention deals with these issues simultaneously.

Other aspects and features of the invention are defined in the claims.

Because of the increased sensitivity that the present invention provides, the invention is particularly useful in the tracking, and demodulation of weak signals, thus providing for improved reception of transmitted signals and synchronisation thereof. More specifically, in prior art methods, in order to obtain a GPS fix where the incoming signal is weak, within say a building, it was often necessary to perform long correlations. However, by means of the invention, correlations may be shortened thereby making it feasible to obtain synchronisation without prior knowledge of the transmitted bit sequence. For instance, in the prior art, correlation periods for GPS are in the order of a half second. By means of the present invention, correlation periods may be of the order of 20 msec. Furthermore, in known GPS, in order to correlate over more than 20 msec it is necessary to know the data modulated by the chips. With this invention this is not necessary as correlation is possible over periods shorter than 20 msec whilst still obtaining bit synchronisation and demodulation even for weak signals.

Preferred features of the invention and their corresponding advantages will be understood from the description below of the various embodiments of the invention. Such embodiments are given merely as examples of specific ways of putting the invention into effect, and are described with reference to the accompanying drawings in which:

DETAILED DESCRIPTION OF THE INVENTION

In spread spectrum systems such as WCDMA, GPS, TDD, unlike analogue systems, a single received pulse is not sufficient to decode the information in a message symbol. Typically in spread spectrum systems each system user has a unique code comprising a string of 1s and (−1s) for example {1, −1, 1, −1, −1, 1}. Each bit of the bit stream to be transmitted would then be spread using the unique code allocated to the user to create a number of pulses. When a pulse stream is received a correlation operation is performed in order to decode the received message. The higher the number of spread bits that are received correctly, the higher the correlation. The correlation is generally achieved by multiplying the received spread bits by the known unique code. If the bit has been correctly received the result will be a large positive number. If not it will be small and may be lost in the noise. In spread spectrum systems, the number of errors received or the bit error rate provides an indication of the strength of the signal.

The present invention is concerned with acquiring bit synchronisation and frequency synchronisation together. The invention utilizes the insight that part of the signal that is used for synchronisation is known to the receiver. The frequency f and the time t used by the receiver to reconstruct the signal are regarded as unknowns. Typically in spread spectrum systems, the receiver clock is required to perform to a specified accuracy and what is unknown is the extent to which it deviates from the ideal (that is, transmitter) clock frequency. Equations are set up that are then solved for these unknowns.

A receiver operating in accordance with the invention has stored therein a correlating surface, and the incoming signal is processed and compared to the correlating surface, and computations are made that lead to the resolution of unknown variables of frequency offset and time offset. Each of these aspects of obtaining the frequency and time offsets will be described below in detail section by section. Further, it should be noted that whilst the preferred method for carrying out the invention is described below with reference to GPS, the methods described are applicable more generally to all spread spectrum systems.

Defining the Correlation Surface

Figure 1:
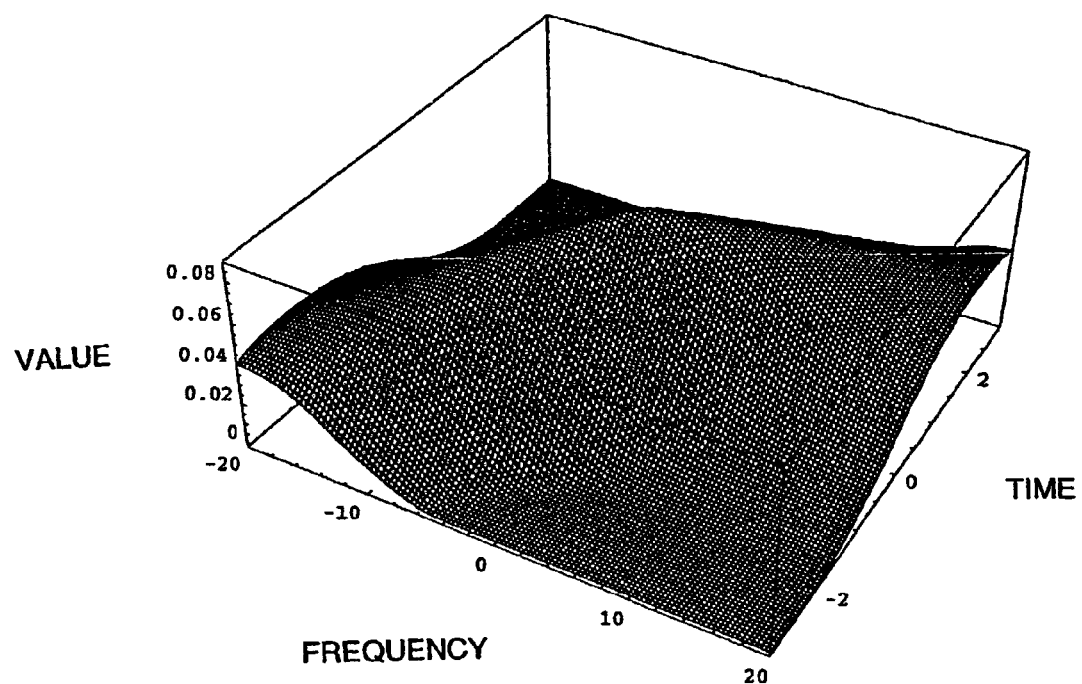
FIG. 1 illustrates an example of a correlation surface in accordance with an embodiment of the present invention.

In a preliminary stage of the present invention, there is defined a correlation surface. The correlation surface is derived from knowledge of the spreading codes of the transmitter. Hence, the correlation surface can be pre-determined and plotted. FIG. 1 shows an ideal correlation surface for the case of a GPS modulated signal as the frequency and time $\Delta f, \Delta t$ respectively are varied. The correlation surface is smooth and continuous.

Correlation is a process that outputs a value given two inputs. The value is set to 1 when both the inputs are identical. The value decreases as the frequency of the two signals differs by a small amount. Similarly the value of the correlation decreases if one signal has been generated using a clock that is offset from the first clock.

Therefore, the correlation process can be characterised by a function with two inputs, time offset, and frequency offset. This two valued function describes a convex surface.

Mathematically, the ideal correlation surface may be determined as follows:

The ideal correlation function is defined at time t, which is the value of the correlation of the received function, as $r[t]$ was equal to $s[f0, t]$ and where f0 is the ideal frequency. Then ideal correlation is given by $$IdealCorrelation[\Delta f, \Delta t][t] = \int_{t}^{t+tc} s[f0, \tau](s[f0+\Delta f, \Delta t+\tau])*d\tau$$

In most of the cases it is assumed that the function is stationary and is independent of time t.

Figure 2:
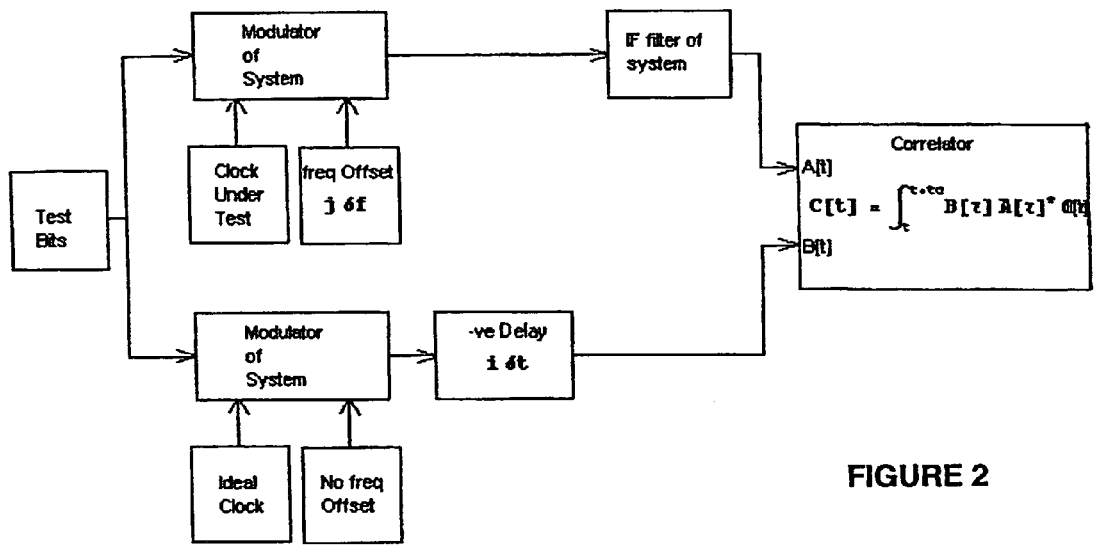
FIGS. 2 and 3 are block diagrams for obtaining a correlation surface.
Figure 3:
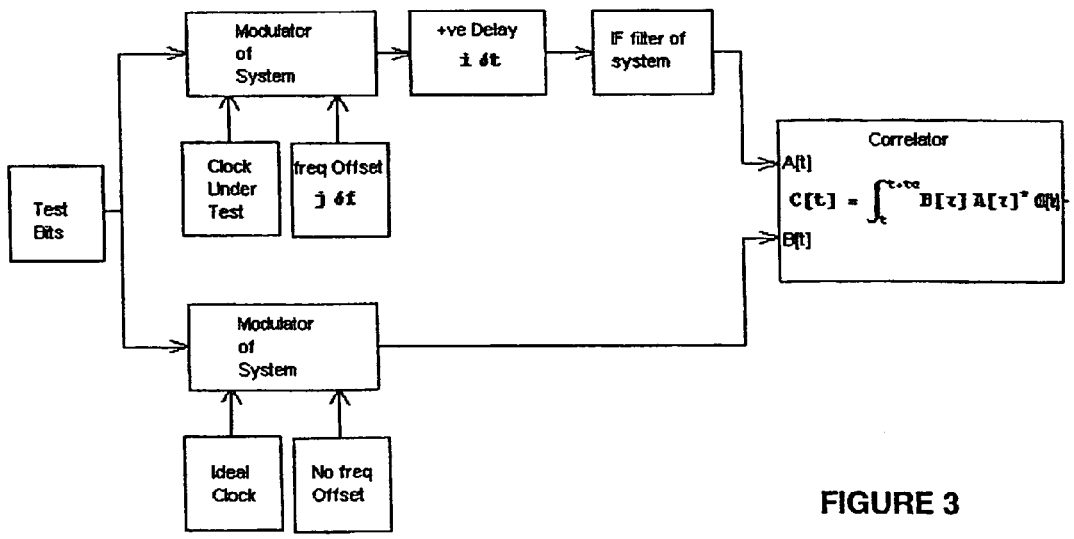

In this case, having determined the correlation surface, it is noted that the surface can be approximated perhaps more efficiently using Box Splines. Alternatively, it is not necessary to calculate the surface. The values of the surface at points can be determined for incremental variables $(i\ \delta t, j\ \delta f)$ as input test bits using the arrangements shown in FIGS. 2 and 3.

As a further refinement, by including the IF filter and the system clock in the chain of processes, the degradation introduced into the system (eg a GPS receiver) by the IF filter and the Allen variance of the clock can be incorporated. These can be determined experimentally for different integer values of i and j and the correlation surface can be obtained using interpolation and Box Splines. As the surface is smooth, it is believed that a cubic Spline should be sufficient. The order of the Splines required depends on the separation of the points. Alternatively, the correlation surface may be provided in the form of a look-up table.

The correlation surface is thus predefined and stored in a memory of the receiver.

Representation of the Received GPS Signal

This section serves to provide a mathematical transformation/representation of the incoming signals that are received at the receiver.

In reaching the receiver, the signal transmitted by a transmitter follows more than one path, having reflected off natural or man-made obstacles. Thus, signals arrive along two or more different paths and are separated in time relative to each other. The point of maximum correlation power needs to be determined for each path in order to identify the chip where synchronisation/correlation occurs for each path.

In order to set up the mathematical representation, first a set of variables are defined as follows:

Time at the Baseband of the receiver is denoted by:

$t_{Re}$

Time at the transmitter is denoted by:

$t$

One of the problems associated with building a receiver is to generate the correct frequencies. Frequency at the transmitter (ie the desired transmitter frequency) is denoted by:

$f0$ which is a constant.

The frequency at which the receiver is operating is denoted by:

$f_{Re}$

Then, the difference between respective receiver and transmitter clocks is given by:

$fRE - fo = Foffset$

The signal $S_{Tr}[t]$ transmitted at the transmitter can be expressed as a general representation of the transmitter encoded bit sequence according the particular modulation scheme:

$$S_{Tr}[f0, t] \stackrel{df}{=} \sum_{k=-\infty}^{\infty} \sum_{l=0}^{M-1} B[k]Ch[l]g[f0, t - kT - lTc]$$

where Chip[l], B[k] are drawn from a known alphabet (eg. (0,1), (−1,1) etc). In CDMA, Chip[l] is known for all l=0,1, 2 . . . M−1. f[t]=0 for Abs[t]>$^k$0T where $^k$0 is a constant. And where B[k]

is the k th Bit to be transmitted,

T is the bit period,

Tc is the chip period (also known as the symbol period),

M is the spreading factor of the code, and hence

T=Tc M and where g[f, t]

is the modulating function that depends on the frequency of the modulator and time of the modulator clock. The function g varies depending on the spread spectrum system, eg GPS, WCDMA etc.

As indicated above, the signal at the receiver is composed of signals arriving via many paths each path with an attendant delay. This is expressed as:

$$S_{Re}[t] \stackrel{df}{=} \sum_{m=1}^{NumberOfPaths} \alpha[m]S_{Tr}[f0 + \Delta f[m], t - \Delta t[m]]$$

where

α [m]

is the signal strength, m being the path label.

Δf[m]

is the shift in frequency caused by the relative movement between the transmitter and the receiver (Doppler shift), or the movement of one of the reflectors of the signal relative to the receiver and where Δt[m]

is the time it takes for the signal to arrive at the receiver through the mth path.

The processing that is performed on the signal may be considered to be like filtering and mixing. At this point, the IF filter may be considered, although for simplicity not the mixer. The signal also represents the baseband signal $S_{IF} t \stackrel{df}{=} S_{Re} t * fil_{IF} t$ here represents a convolution operation.

Thus, baseband signal as a result of multi-paths may be represented as follows:

$$S_{IF}[t] = \sum_{m=1}^{NumberOfPaths} (\alpha[m]S_{Tr}[f0 + \Delta f[m], t + \Delta t[m]]) * fil_{IF}[t]$$

$$S_{IF}[t] = \sum_{m=1}^{NumberOfPaths} \left( \alpha[m] \left( \sum_{k=-\infty}^{\infty} \sum_{l=0}^{M-1} B[k]Ch[l]g[f0 + \Delta f[m], t - kT - lTc + \Delta t[m]] \right) \right) * fil_{IF}[t]$$

Factoring gives $$S_{IF}[t] = \sum_{m=1}^{NumberOfPaths} \left( \alpha[m] \left( \sum_{k=-\infty}^{\infty} B[k] \left( \sum_{l=0}^{M-1} Ch[l](g[f0 + \Delta f[m], t - kT - lTc + \Delta t[m]] * fil_{IF}[t]) \right) \right) \right)$$

The convolution can be expressed as:

$$S_{IF}[t] = \sum_{m=1}^{NumberOfPaths} \left( \alpha[m] \left( \sum_{k=-\infty}^{\infty} B[k] \left( \sum_{l=0}^{M-1} Ch[l] \int_{-\infty}^{\infty} (g[f0 + \Delta f[m], t - t_1 - kT - lTc + \Delta t[m]]fil_{IF}[t_1])dt_1 \right) \right) \right)$$

In terms of the receiver time $t_{Re}$ $$S_{IF}[t_{Re}] = \sum_{m=1}^{NumberOfPaths} \left( \alpha[m] \left( \sum_{k=-\infty}^{\infty} B[k] \left( \sum_{l=0}^{M-1} Ch[l] \int_{-\infty}^{\infty} (g[f0 + \Delta f[m], t_{Re} - t_1 - kT - lTc + \Delta t[m]]fil_{IF}[t_1])dt_1 \right) \right) \right)$$

This is a mathematical representation of the received signal at baseband.

Correlation with Time and Frequency Shifted Expected Signal

One of the inputs for the correlation is the received signal at baseband signal. This signal according to the receiver's clock is given by:

$S_{IF}[t_{Re}]$

The other signal needed for correlation in terms of the kth bit being transmitted is the correlating signal defined below:

$$CorrelatingSignal[k][f, t] \stackrel{df}{=} \left( \sum_{l=0}^{M-1} Ch[l]g[f, t - kT - lTc] \right)$$

This correlating signal is a local reproduction of the signal that the transmitter generates in order to transmit the kth symbol using the spreading chips Ch[l].

The receiver aims to ascertain the time the signal has taken to reach it. In doing so it generates a correlating signal as follows:

$$CorrelatingSignal[k][f+\mu, t_{Re}+\tau+\Delta t_{Re}[n]]$$

for the nth path and correlates it with the incoming processed signal, where $$\Delta t_{Re}[n]$$

is the estimate that the receiver has made of the time the signal takes to reach it, in other words the time lag. This estimate may be based on the value that was used previously (e.g. when the receiver is in tracking mode), or it is in search mode and it is merely trying out the value in order to obtain coarse acquisition. And where:

$$\mu$$

is the offset in frequency in the order of a few Hertz, and $$\tau$$

is a small offset in time in the order of fractions of a chip period.

The result of performing the correlation to get the contribution from the nth path to the kth bit leads to $$\Gamma[n][\mu, \tau] = \int_{-(\tau+\Delta t_{Re}[n])}^{T-(\tau+\Delta t_{Re}[n])} (S_{IF}[t_{Re}]$$

$$(CorrelatingSignal[k][f + \mu, t_{Re} + \tau + \Delta t_{Re}[n]])\wedge *) dt_{Re}$$

where $$\Gamma[n][\mu, \tau]$$

is the result of the correlation shifted in frequency by $$\mu$$

and $$\tau$$

is the offset in time for the nth path.

Making the substitution in the equation above for the baseband signal $$S_{IF}[t_{Re}]$$

leads to:

$$\Gamma[n][\mu, \tau] = \int_{-(\tau+\Delta t_{Re}[n])}^{T-(\tau+\Delta t_{Re}[n])} \left( \sum_{m=1}^{NumberOfPaths} \left( \alpha[m] \right. \right.$$

-continued $$\left. \left( \sum_{k=-\infty}^{\infty} B[k] \left( \sum_{l=0}^{M-1} Ch[l] \int_{-\infty}^{\infty} (g[f0 + \Delta f[m], t_{Re} - t_1 - kT - \right.\right.\right.$$

$$lTc + \Delta t[m]] fil_{IF} [t_1]) dt_1 \bigg) \bigg) \bigg)$$

$$CorrelatingSignal[k][f + \mu, t_{Re} + \tau + \Delta t_{Re}[n]])\wedge *\bigg) dt_{Re}$$

The order of performing the integral may be changed thus:

$$\Gamma[n][\mu, \tau] = \left( \sum_{m=1}^{NumberOfPaths} \left( \alpha[m] \right.\right.$$

$$\left( \sum_{k=-\infty}^{\infty} B[k] \left( \sum_{l=0}^{M-1} Ch[l] \int_{-(\tau+\Delta t_{Re}[n])}^{T-(\tau+\Delta t_{Re}[n])} \left( \int_{-\infty}^{\infty} (g[f0 + \Delta f[m], t_{Re} - \right.\right.\right.$$

$$t_1 - kT - lTc + \Delta t[m]] fil_{IF} [t_1]) dt_1 \bigg) \bigg)$$

$$(CorrelatingSignal[k][f + \mu, t_{Re} + \tau + \Delta t_{Re}[n]])\wedge *\bigg| dt_{Re} \bigg)$$

This is followed by a change in variable. This is a mathematical representation of how the final output is related to the correlation surface.

$$t2 = t_{Re} + \Delta t[m]$$

in the equation $$\Gamma[n][\mu, \tau] = \left( \sum_{m=1}^{NumbberOfPaths} \left( \alpha[m] \right.\right.$$

$$\left( \sum_{k=-\infty}^{\infty} B[k] \left( \sum_{l=0}^{M-1} Ch[l] \int_{-(\tau+\Delta t_{Re}[n])+\Delta t[m]}^{T-(\tau+\Delta t_{Re}[n])+\Delta t[m]} \left( \int_{-\infty}^{\infty} (g[f0 + \Delta f[m], \right.\right.\right.$$

$$t2 - t_1 - kT - lTc] fil_{IF} [t_1]) dt_1 \bigg) \bigg)$$

$$(CorrelatingSignal[k][f + \mu, t2 - \Delta t[m] + \tau + \Delta t_{Re}[n]])\wedge *\bigg| dt2 \bigg)$$

Replacing the integral in the computation back to convolution leads to:

$$\Gamma[n][\mu, \tau] =$$

$$\left( \sum_{m=1}^{NumbberOfPaths} \left( \alpha[m] \left( \sum_{k=-\infty}^{\infty} B[k] \left( \sum_{l=0}^{M-1} Ch[l] \int_{-(\tau+\Delta t_{Re}[n])+\Delta t[m]}^{T-(\tau+\Delta t_{Re}[n])+\Delta t[m]} (g[f0 + \right.\right.\right.\right.$$

-continued $$\Delta f[m], t2 - t_1 - kT - lTc] * fil_{IF}[t_2]))$$

$$(CorrelatingSignal[k][f + \mu, t2 - \Delta t[m] + \tau + \Delta t_{Re}[n]])\wedge *\bigg)dt2\bigg)$$

Mapping onto the Correlation Surface

In this section, the time and frequency offsets of the received signal with the ideal signal are mapped together with the shifted time and frequency values onto the correlation surface to provide a computational expression. The correlation surface was defined previously.

$$CorrelatingSurface \ [\mu, \tau] \stackrel{df}{=}$$

$$\left(\sum_{l=0}^{M-1} Ch[l] \int_{-\tau}^{T-\tau} ((g[f0, t2 - t_1 - kT - lTc] * fil_{IF}[t_2])\right.$$

$$(CorrelatingSignal \ [k] \ [f + \mu, t2 + \tau])\wedge *)dt2\bigg)$$

With the time and frequency differences put into the correlation equation, then $$\left(\sum_{l=0}^{M-1} Ch[l] \int_{-(\tau+\Delta t_{Re}[n])+\Delta t[m]}^{T-(\tau+\Delta t_{Re}[n])+\Delta t[m]} ((g[f0 + \Delta f[m]],\right.$$

$$t2 - t_1 - kT - lTc] * fil_{IF}[t_2])$$

$$(CorrelatingSignal \ [k] \ [f + \mu, t2 - \Delta t[m] + \tau + \Delta t_{Re}[n]]) \wedge *)dt2\bigg) =$$

$$CorrelatingSurface[f - f0 - \Delta f[m] + \mu, -\Delta t[m] + \tau + \Delta t_{Re}[n]]$$

The correlating surface expression derived previously can now be substituted into the above expression:

$$\Gamma[n] \ [\mu, \tau] =$$

$$\left(\sum_{m=1}^{NumberOfPaths} \left(\alpha[m] \left(\sum_{k=-\infty}^{\infty} B[k] \ CorrelatingSurface[f - f0 - \Delta f[m] + \mu,\right.\right.\right.$$

$$\left.\left.\left.-\Delta t[m] + \tau + \Delta t_{Re}[n]]\right)\right)\right)$$

The above expression will be non zero for only those cases where $$Abs[f-f0-\Delta f[m]+\mu]<2Hz$$

and $$Abs[-\Delta t[m] + \tau + \Delta t_{Re}[n]] < \frac{1}{2}Tc$$

As indicated earlier, synchronisation aims to establish determining the value $$\tau 0$$

and $$\mu 0$$

so that $$f-f0-\Delta f[m]+\mu 0=0$$

and $$-\Delta t[m]+\tau 0+\Delta t_{Re}[n]=0$$

Prediction of the Correlating Result Using the Correlating Surface

For a receiver that is synchronised both in time and frequency for the nth path, it is not necessary to make an adjustment and in these circumstances the value $$\Gamma[n][\mu, \tau]$$

can be predicted by $$\Gamma[n][\mu, \tau]=(\alpha[m] \ B[k] \ CorrelatingSurface[\mu, \tau])$$

where the contribution from all other paths is assumed to be zero. For simplicity, the value of B[k] is taken to be 1

$$\Gamma[n][\mu, \tau]=(\alpha[m] \ CorrelatingSurface[\mu, \tau])$$

When the system is not perfectly synchronised, the time requires adjustment by say $$\tau 0$$

and the frequency by $$\mu 0$$

The expected result is therefore modified to be:

$$\Gamma[n][\mu, \tau]=(\alpha[m] \ CorrelatingSurface[\mu+\mu 0, \tau+\tau 0])$$

For GPS system, offsets are given by $$\mu$$

in Hz and $$\tau$$

in units of T, and the correlating surface is $$CorrelatingSurface[\{\mu\_, \tau\_\}] := 1.0282397173771807` -$$

$$0.6561546163982793`\mu +$$

$$0.16121834444658398`\mu^2 -$$

$$0.041119148280990614`\tau +$$

$$0.531238073030845`\mu\tau -$$

$$0.5671706714002305`\mu^2\tau -$$

$$0.005007915014931778`\tau^2 -$$

$$0.0571012049318205`\mu\tau^2 +$$

$$0.09078005351970127`\mu^2\tau^2$$

Therefore, with a shift in frequency by 0.1 Hz and by 0.1 Tc, the following algebraic expression is expected:

(α[m] CorrelatingSurface[{0.1+μ0, 0.1 +τ0}])//Simplify (−0.0389452 μ0 (−8.83503 + τ0) (−1.69297 + τ0) +

0.0907801 μ0² (−5.84923 + τ0) (−0.198513 + τ0) −

0.00981023 (−10.1421 + τ0) (9.69655 + τ0)) α[m]

It is noted that this is an algebraic expression in terms of the unknowns

μ0, τ0, and α[m]

The actual measured value of the result of the correlation performed earlier is denoted by Ξ[n][μ, τ]

If there was no noise in the received signal, the following equation could be set up:

Γ[n][μ, τ]=Ξ[n][μ, τ]

Being explicit for the case above, the following equation is obtained involving exactly three unknowns.

( −0.038945194227880245`μ0(−8.835028210083548` + τ0)

(−1.6929690957226662` + τ0) +

0.09078005351970127`μ0²(−5.849232627906463` + τ0)

(−0.19851287796220235` + τ0) −

0.009810234972916814`(−10.142097500134339` + τ0)

(9.696552074813233` + τ0))α[m] == Ξ [n][0.1, 0.1]

By setting up three different equations, the unknowns can be determined. This is however not strictly the case as there is noise present in the system. The following algebraic expression is set up including the noise (α[m] CorrelatingSurface[{μ+μ0, τ+τ0}])−Ξ[n][{μ, τ}])^2

This expression is obtained by subtracting the predicted algebraic expression from the actual measured correlation result and squaring the result of the subtraction.

This is carried for several different values of

{μ, τ}

For instance, let the set of values over which this operation is performed be denoted TimeFreqShifts, then TimeFreqShifts = {{0, −3 δt}, {0, −2 δt}, {−δf, −2 δt}, {δf, −2 δt}, {0, −δt}, {−δf, −δt}, {δf, −δt}, {−2 δf, −δt}, {2 δf, −δt}, {0, 0}, {−δf, 0}, {δf, 0}, {−2 δf, 0}, {2 δf, 0}, {−3 δf, 0}, {3 δf, 0}, {0, δt}, {−δf, δt}, {δf, δt}, {−2 δf, δt}, {2 δf, δt}, {0, 2 δt}, {−δf, 2 δt}, {δf, 2 δt}, {0, 3 δt}};

and for each element

λ in TimeFreqShifts the expected noise is calculated according to:

(μ[m] CorrelatingSurface[{μ+μ0, τ+τ0}])−Ξ[n][{μ, τ}])^2 where

λ={μ, τ}

Several noise contributions are then added together to arrive at an algebraic expression for the total noise as a function of the unknowns μ0, τ0, and α[m]

$$\sum_{\lambda \in TimeFreqShifts} (\alpha[m]CorrelatingSurface[\{\mu + \mu 0, \tau + \tau 0\}] - \Xi[n][\lambda])^{\wedge}2$$

and where λ={μ, τ}

This expression is called the Cost.

$$Cost = \sum_{\lambda \in TimeFreqShifts} (\alpha[m]CorrelatingSurface[\{\mu + \mu 0, \tau + \tau 0\}] - \Xi[n][\lambda])^2$$

The cost is an implicit function of the set TimeFreqShifts and the unknowns

μ0, τ0, and α[m]

Any standard mathematical procedure can now be employed for minimising the expression to find the values for the unknowns that best minimise the cost.

EXAMPLE

The following example of a preferred implementation of the present invention in an example run in the computer program Mathematica 4.

One method that can be used for finding the values is given in the following example for

τ0 and

μ0

Any assumptions involved in the demonstration in that there exists exactly one path such that −Δt[m]+Δt$_{Re}$[n]=0.4Tc For all other paths it is assumed:

Abs[−Δt[m]+Δt$_{Re}$[n]]>3Tc f−f0−Δf[m]=0.35 Hz

Let the strength

α[m]=0.8

Assume B[k]=1;

In the sequel, all the time units are in Tc, chip periods and all the frequencies are in Hz.

This assumption is consistent with the system tracking one path. Under these assumptions the following is arrived at:

$$\Gamma[n][\mu, \tau] = 0.8 \text{ CorrelatingSurface }[\mu+0.35, \tau+0.4]$$

For GPS the correlation surface function is calculated to be:

$$CorrelationSurface[\{\mu\_, \tau\_\}] := 1.0282397173771807` -$$
$$0.6561546163982793`\mu +$$
$$0.16121834444658398`\mu^2 -$$
$$0.041119148280990614`\tau +$$
$$0.531238073030845`\mu\tau -$$
$$0.5671706714002305`\mu^2\tau -$$
$$0.005007915014931778`\tau^2 -$$
$$0.0571012049318205`\mu\tau^2 +$$
$$0.09078005351970127`\mu^2\tau^2$$

For simplicity in this example, a set of time shift and frequency shift pairs have been defined over which to estimate the correlation function for each path.

$\delta t = 0.1; \delta f = 0.1;$

Figure 4:
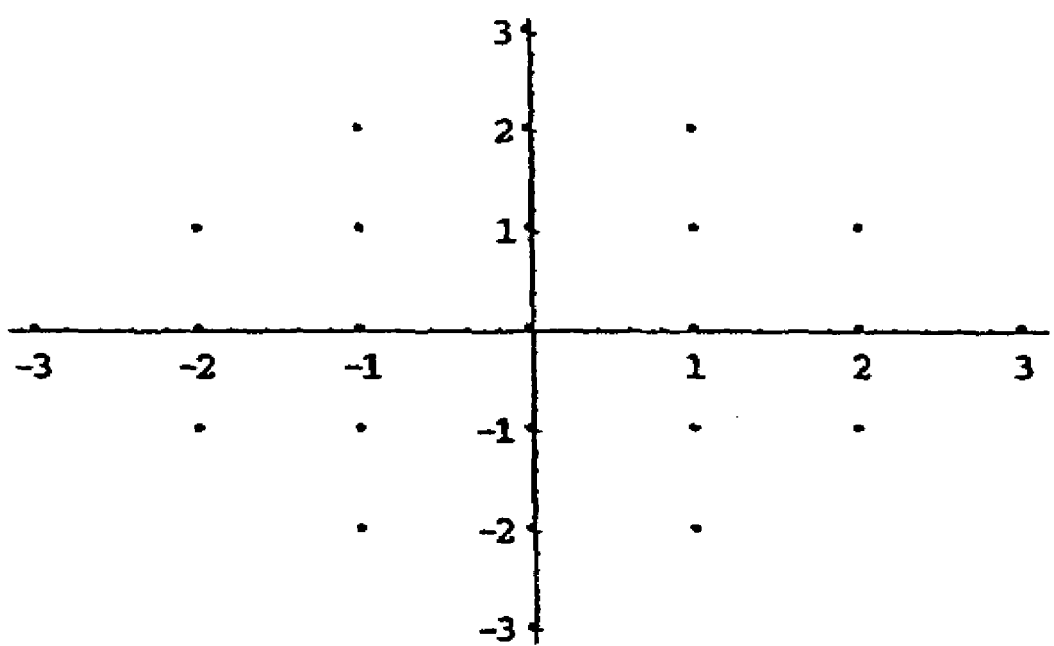
FIG. 4 is a plot of time and frequency pairs.

The time shift and frequency pairs are conveniently taken from the topology diagram from FIG. 4.

FIG. 4 shows a topological function that assigns more correlators to the centre frequency. It may in the context of a specific situation be more appropriate to assign more correlators in the frequency that is most likely.

$$TimeFreqShifts = \{\{0, -3\delta t\}, \{0, -2\delta t\}, \{-\delta f, -2\delta t\},$$
$$\{\delta f, -2\delta t\}, \{0, -\delta t\}, \{-\delta f, -\delta t\},$$
$$\{\delta f, -\delta t\},$$
$$\{-2\delta f, -\delta t\}, \{2\delta f, -\delta t\}, \{0, 0\},$$
$$\{-\delta f, 0\}, \{\delta f, 0\}, \{-2\delta f, 0\}, \{2\delta f, 0\},$$
$$\{-3\delta f, 0\},$$
$$\{3\delta f, 0\}, \{0, \delta t\}, \{-\delta f, \delta t\}, \{\delta f, \delta t\},$$
$$\{-2\delta f, \delta t\}, \{2\delta f, \delta t\}, \{0, 2\delta t\},$$
$$\{-\delta f, 2\delta t\}, \{\delta f, 2\delta t\}, \{0, 3\delta t\}\};$$

It is necessary then to calculate the result of the correlation $\Gamma[n][\mu, \tau]$ given baseband signal is correlated with a signal that has been shifted in frequency and time by $\{\mu, \tau\}$ It is convenient to store the result of this in the form $\{\{\mu, \tau\}, \Gamma[n][\mu, \tau]\}$ for all different frequency shift time combinations for one particular path $\{\Gamma[n][0, -3\delta t], \Gamma[n][0, -2\delta t], \Gamma[n][-\delta f, -2\delta t],$
$\Gamma[n][\delta f, -2\delta t], \Gamma[n][0, -\delta t], \Gamma[n][-\delta f, -\delta t],$
$\Gamma[n][\delta f, -\delta t], \Gamma[n][-2\delta f, -\delta t], \Gamma[n][2\delta f, -\delta t], \Gamma[n][0, 0],$
$\Gamma[n][-\delta f, 0], \Gamma[n][\delta f, 0], \Gamma[n][-2\delta f, 0], \Gamma[n][2\delta f, 0],$
$\Gamma[n][-3\delta f, 0], \Gamma[n][3\delta f, 0], \Gamma[n][0, \delta t], \Gamma[n][-\delta f, \delta t],$
$\Gamma[n][\delta f, \delta t], \Gamma[n][-2\delta f, \delta t], \Gamma[n][2\delta f, \delta t],$
$\Gamma[n][0, 2\delta t], \Gamma[n][-\delta f, 2\delta t], \Gamma[n][\delta f, 2\delta t], \Gamma[n][0, 3\delta t]\}$ The list is denoted by the term OutputOfArrayOfCorrelators.

For GPS, the result of the correlator leads to the following.

$OutputOfArrayOfCorrelators = \{\{\{0, -0.30000000000000004`\},$
$\quad 0.6605837584271745`\},$
$\{\{0, -0.2`\}, 0.6662776733053989`\},$
$\{\{-0.1`, -0.2`\}, 0.7079850175137978`\},$
$\{\{0.1`, -0.2`\}, 0.625392975693917`\},$
$\{\{0, -0.1`\}, 0.6717496237006648`\},$
$\{\{-0.1`, -0.1`\}, 0.7119400152388182`\},$
$\{\{0.1`, -0.1`\}, 0.631547029728004`\},$
$\{\{-0.2`, -0.1`\}, 0.7521182043424641`\},$
$\{\{0.2`, -0.1`\}, 0.5913322333208358`\},$
$\{\{0, 0\}, 0.6769996096129723`\},$
$\{\{-0.1`, 0\}, 0.7156772615573921`\},$
$\{\{0.1`, 0\}, 0.637503955819747`\},$
$\{\{-0.2`, 0\}, 0.7535369116530061`\},$
$\{\{0.2`, 0\}, 0.5971903001777158`\},$
$\{\{-0.30000000000000004`, 0\},$
$\quad 0.7905785598998143`\},$
$\{\{0.30000000000000004`, 0\},$
$\quad 0.5560586426868691`\},$
$\{\{0, 0.1`\}, 0.6820276310423212`\},$
$\{\{-0.1`, 0.1`\}, 0.7191967564695193`\},$
$\{\{0.1`, 0.1`\}, 0.6432637539691456`\},$
$\{\{-0.2`, 0.1`\}, 0.7547711302507397`\},$
$\{\{0.2`, 0.1`\}, 0.6029051252499921`\},$
$\{\{0, 0.2`\}, 0.6868336879887117`\},$
$\{\{-0.1`, 0.2`\}, 0.7224984999752001`\},$
$\{\{0.1`, 0.2`\}, 0.6488264241762`\},$
$\{\{0, 0.30000000000000004`\},$
$\quad 0.6914177804521437`\}\};$ Transpose [{TimeFreqShifts, Map [0.8 Correlation-Surface [#+{0.35, 0.4}] &, TimeFreqShifts]}]

{{{0, −0.3}, 0.660584}, {{0, −0.2}, 0.666278},
{{−0.1, −0.2}, 0.707985},
{{0.1, −0.2}, 0.625393}, {{0, −0.1}, 0.67175},

{{−0.1, −0.1}, 0.71194},
{{0.1, −0.1}, 0.631547},
{{−0.2, −0.1}, 0.752118},
{{0.2, −0.1}, 0.591332}, {{0, 0}, 0.677},
{{−0.1, 0}, 0.715677}, {{0.1, 0}, 0.637504},
{{−0.2, 0}, 0.753537}, {{0.2, 0}, 0.59719},
{{−0.3, 0}, 0.790579}, {{0.3, 0}, 0.556059},
{{0, 0.1}, 0.682028}, {{−0.1, 0.1}, 0.719197},
{{0.1, 0.1}, 0.643264},
{{−0.2, 0.1}, 0.754771},
{{0.2, 0.1}, 0.602905}, {{0, 0.2}, 0.686834},
{{−0.1, 0.2}, 0.722498},
{{0.1, 0.2}, 0.648826}, {{0, 0.3}, 0.691418}}

Arranging these in a list, these are the values that are derived:

TimeFreqShifts
{{0, −0.3}, {0, −0.2}, {−0.1, −0.2},
{0.1, −0.2}, {0, −0.1}, {−0.1, −0.1},
{0.1, −0.1}, {−0.2, −0.1}, {0.2, −0.1},
{0, 0}, {−0.1, 0}, {0.1, 0}, {−0.2, 0},
{0.2, 0}, {−0.3, 0}, {0.3, 0},
{0, 0.1}, {−0.1, 0.1}, {0.1, 0.1},
{−0.2, 0.1}, {0.2, 0.1}, {0, 0.2},
{−0.1, 0.2}, {0.1, 0.2}, {0, 0.3}}

What is also known is the formula for the surface.

$$CorrelationSurface[\{\mu\_, \tau\_\}] := 1.0282397173771807` -$$
$$0.6561546163982793`\mu +$$
$$0.16121834444658398`\mu^2 -$$
$$0.041119148280990614`\tau +$$
$$0.531238073030845`\mu\tau -$$
$$0.5671706714002305`\mu^2\tau -$$
$$0.005007915014931778`\tau^2 -$$
$$0.0571012049318205`\mu\tau^2 +$$
$$0.09078005351970127`\mu^2\tau^2$$

Cost=Map [(a CorrelationSurface [#[[1]]+{μ0, τ0}]−
[[2]])^2&, OutputOfArrayOfCorrelators]//Apply [Plus, #] &//Simplify//Expand in this case given by:

$$11.5027 - 35.1259\, a + 26.8266\, a^2 + 22.3214\, a\mu0 -$$
$$34.1526\, a^2\mu0 - 5.48374\, a\mu0^2 + 19.447\, a^2\mu0^2 -$$
$$5.67436\, a^2\mu0^3 + 0.8325\, a^2\mu0^4 + 2.0042\, a\tau0 - 3.0949\, a^2\tau0 -$$
$$18.4095\, a\mu0\tau0 + 30.0936\, a^2\mu0\tau0 + 19.1592\, a\mu^2\tau0 -$$
$$47.5942\, a^2\mu0^2\tau0 + 23.1414\, a^2\mu0^3\tau0 - 4.73256\, a^2\mu0^4\tau0 +$$
$$0.0823288\, a\tau0^2 + 0.100551\, a^2\tau0^2 + 2.00361\, a\mu0\tau0^2 -$$
$$5.01711\, a^2\mu0\tau0^2 - 3.06804\, a\mu0^2\tau0^2 + 15.825\, a^2\mu0^2\tau0^2 -$$
$$18.5361\, a^2\mu0^3\tau0^2 + 8.79955\, a^2\mu0^4\tau0^2 - 0.0249395\, a^2\tau0^3 +$$
$$0.235887\, a^2\mu0\tau0^3 - 1.88262\, a^2\mu0^2\tau0^3 + 4.0306\, a^2\mu0^3\tau0^3 -$$
$$2.57439\, a^2\mu0^4\tau0^3 + 0.00207052\, a^2\tau0^4 - 0.00187509\, a^2\mu0\tau0^4 +$$
$$0.0844947\, a^2\mu0^2\tau0^4 - 0.259183\, a^2\mu0^3\tau0^4 + 0.206025\, a^2\mu0^4\tau0^4$$

The cost function can now be minimised to yield the unknowns.

Several algorithms can be developed from this cost function, depending on the uncertainties of t and f.

In order to obtain an initial solution, the time delay and the frequency delay shift values are selected from the OutputArrayCorrelators with the highest correlation value.

InitialSolution[OutputOfArrayOfCorrelators_,
 Cost_]:=Module[{x1, x2, x3}, x1=Sort[OutputOfArrayOfCorrelators, #1 [[2]]≧#2
 [[2]]&]//First;

x2=Cost/·{μ0→−x1[[1, 1]], τ0→−x1 [[1, 2]]};

x3=Solve[x2=0, a];

{a→(x3 [[1, 1, 2]]//Re), μ0→−x1 [[1, 1]], τ0→−x1[[1, 2]]}]

OldSol=InitialSolution[OutputOfArrayOfCorrelators, Cost]
{a→0.795264, μ0→0.3, τ0→0}

ImproveSolution[Cost_][OldSol_]:=Module[{x1, x2,
 x3, x4, x5, x6, x7, x8}, x1=(D[Cost, a]/·{OldSol [[2]], OldSol [[3]]})=0//
 Solve[#, a]& // Flatten;

x2=((D[ Cost, μ0]/a) //Simplify);

x3=((x2/·x1/·OldSol[[3]])//Expand);

x4=Solve[x3=0, μ0]//Flatten;

x5=Select[x4, Re [#[[2]]]]=#[[2]]&];

x6=(D[Cost, τ0]/a)//Simplify;

x7=((x6 /·x1/·x5)//Expand);

x8=Solve[x7=0, τ0]//Flatten;

x9=Select[x8, Re [#[[2]]]]=#[[2]]&];

Join[x1, x5, x9]]

Nest[ImproveSolution[Cost], OldSol, 1000]

{a→0.799884, μ0 →0.349689, τ0→0.399462}

Without prior knowledge of the value of f−f0−Δf[m]

which has been assumed to be 0.35 Hz and

−Δt[m]+Δt$_{Re}$[n]

which has been assumed to be 0.4 Tc

The present invention may be embodied in other specific forms without departing from its essential attributes. Reference should thus be made to the appended claims and other general statements herein rather than to the foregoing description as indicating the scope of invention.

Furthermore, each feature disclosed in this specification (which term includes the claims) and/or shown in the drawings may be incorporated in the invention independently of other disclosed and/or illustrated features. In this regard, the invention includes any novel feature or combination of features disclosed herein either explicitly or any generalisation thereof irrespective of whether or not it relates to the claimed invention or mitigates any or all of the problems addressed.

The appended abstract as filed herewith is included in the specification by reference.

What is claimed is:

1. A method for operation of a receiver of a spread spectrum system in which a signal received at the receiver has a received time and frequency and is transmitted from a transmitter in accordance with a predetermined modulation scheme and having a transmitted time and frequency, there being a time offset and a frequency offset between the received signal and the transmitted signal, and in which the receiver includes a predefined correlation surface in accordance with the predetermined modulation scheme, the method comprising:

generating in the receiver an expected signal, the expected signal being a function of time and frequency comprising a frequency parameter shifted from the transmitter frequency and a time parameter shifted from the transmitter time, correlating the received time and frequency of the received signal with said time and frequency shifted parameters of the expected signal to provide respective correlation measures therebetween, deriving, using said correlation surface, a computational expression indicative of the value of the correlation at a point displaced in time by the time offset plus the time shift and displaced in frequency by the frequency offset plus the frequency shift, and comparing the correlation measure with the computational expression and determining the time offset and the frequency offset.

2. A method for operation of a receiver, according to claim 1, wherein the step of deriving the computational expression alternatively comprises mapping the time and frequency offset parameters with the time and frequency offsets onto the correlation surface.

3. A receiver for operating in a spread spectrum system in which a signal received at the receiver has a received time and frequency and is transmitted from a transmitter in accordance with a predetermined modulation scheme with a transmitted time and frequency, there being a time offset and a frequency offset between the received signal and the transmitted signal, and in which the receiver includes a predefined correlation surface in accordance with the predetermined modulation scheme, the receiver comprising:

generating means for generating in the receiver an expected signal, the expected signal being a function of time and frequency comprising a frequency parameter shifted from the transmitter frequency and a time parameter shifted from the transmitter time, correlating means for correlating the received time and frequency of the received signal with said time and frequency shifted parameters of the expected signal to provide respective correlation measures therebetween, processing means for deriving, using said correlation surface, a computational expression indicative of the value of the correlation at a point displaced in time by the time offset plus the time shift and displaced in frequency by the frequency offset plus the frequency shift, and comparator means for comparing the correlation measure with the computational expression to determine and output indicative of the time offset and the frequency offset.

4. A computer program on a carrier for synchronising a receiving operating in a spread spectrum system in which a signal received at the receiver has a received time and frequency and is transmitted from a transmitter in accordance with a predetermined modulation scheme with a transmitted time and frequency, there being a time offset and a frequency offset between the received signal and the transmitted signal, and in which the receiver includes a predefined correlation surface in accordance with the predetermined modulation scheme, the program comprising:

generating means for generating in the receiver an expected signal, the expected signal being a function of time and frequency comprising a frequency parameter shifted from the transmitter frequency and a time parameter shifted from the transmitter time, correlating means for correlating the received time and frequency of the received signal with said time and frequency shifted parameters of the expected signal to provide respective correlation measures therebetween, processing means for deriving, using said correlation surface, a computational expression indicative of the value of the correlation at a point displaced in time by the time offset plus the time shift and displaced in frequency by the frequency offset plus the frequency shift, and comparator means for comparing the correlation measure with the computational expression to determine and output indicative of the time offset and the frequency offset.

5. A computer program product operable to synchronise a receiver in a spread spectrum system in which a signal received at the receiver has a received time and frequency and is transmitted from a transmitter in accordance with a predetermined modulation scheme with a transmitted time and frequency, there being a time offset and a frequency offset between the received signal and the transmitted signal, and in which the receiver includes a predefined correlation surface in accordance with the predetermined modulation scheme, the synchronisation comprising:

generating means for generating in the receiver an expected signal, the expected signal being a function of time and frequency comprising a frequency parameter shifted from the transmitter frequency and a time parameter shifted from the transmitter time, correlating means for correlating the received time and frequency of the received signal with said time and frequency shifted parameters of the expected signal to provide respective correlation measures therebetween, processing means for deriving, using said correlation surface, a computational expression indicative of the value of the correlation at a point displaced in time by the time offset plus the time shift and displaced in frequency by the frequency offset plus the frequency shift, and comparator means for comparing the correlation measure with the computational expression to determine and output indicative of the time offset and the frequency offset.

6. A portable radio communication device including a receiver operable in a spread spectrum system in which a signal received at the receiver has a received time and frequency and is transmitted from a transmitter in accordance with a predetermined modulation scheme with a transmitted time and frequency, there being a time offset and a frequency offset between the received signal and the transmitted signal, and in which the receiver includes a predefined correlation surface in accordance with the predetermined modulation scheme, the receiver comprising:

generating means for generating in the receiver an expected signal, the expected signal being a function of time and frequency comprising a frequency parameter shifted from the transmitter frequency and a time parameter shifted from the transmitter time, correlating means for correlating the received time and frequency of the received signal with said time and frequency shifted parameters of the expected signal to provide respective correlation measures therebetween, processing means for deriving, using said correlation surface, a computational expression indicative of the value of the correlation at a point displaced in time by the time offset plus the time shift and displaced in frequency by the frequency offset plus the frequency shift, and comparator means for comparing the correlation measure with the computational expression to determine and output indicative of the time offset and the frequency offset.

* * * * *